United States Patent [19]

Rather, Sr. et al.

[11] Patent Number: 5,325,776
[45] Date of Patent: Jul. 5, 1994

[54] BACKING FOR FLEXOGRAPHIC PRINTING PLATES

[76] Inventors: Thomas K. Rather, Sr.; Kathyrn E. Rather, both of 3383 Ironworks, Georgetown, Ky. 40324

[21] Appl. No.: 111,825

[22] Filed: Aug. 25, 1993

Related U.S. Application Data

[63] Continuation of Ser. No. 843,892, Feb. 27, 1992, abandoned.

[51] Int. Cl.$^5$ .................... B32B 3/26; B41N 6/00
[52] U.S. Cl. .................. 101/382.1; 428/314.8; 428/315.5; 428/315.7; 428/315.9; 428/323; 428/327; 428/909; 428/40; 428/343
[58] Field of Search ........... 428/315.5, 315.7, 314.4, 428/315.9, 323, 327, 908, 909, 314.8

[56] References Cited

U.S. PATENT DOCUMENTS

| | | | |
|---|---|---|---|
| 3,428,517 | 2/1969 | Grupe et al. | 428/409 |
| 3,795,568 | 3/1974 | Rhodarmer et al. | 428/240 |
| 3,903,794 | 9/1975 | Grupe et al. | 101/401.1 |
| 4,112,841 | 9/1978 | Deshpande | 428/909 |
| 4,234,640 | 11/1980 | Wittel | 428/159 |
| 4,303,721 | 12/1981 | Rodriguez | 428/213 |
| 4,574,697 | 3/1986 | Feeley | 101/401.1 |
| 4,771,078 | 9/1988 | Schisler et al. | 521/50.5 |
| 4,871,631 | 10/1989 | Pieper et al. | 430/14 |
| 5,015,556 | 5/1991 | Martens | 430/306 |

Primary Examiner—George F. Lesmes
Assistant Examiner—Christopher Brown
Attorney, Agent, or Firm—Ryan, Kees & Hohenfeldt

[57] ABSTRACT

An improved cushioning backing sheet material to be positioned between a flexographic printing cylinder and a flexible printing plate is provided. The backing sheet material has a uniform thickness of about 30 to 60 mils and a density greater than 40 pounds per cubic foot. The backing is sufficiently deformable to experience a reduction in thickness of 6 to 9 percent when subjected to a compressive force of 45 psi and has a resiliency sufficient to recover at least 99.5 percent of its original thickness within 0.1 second after the compressive force is removed.

8 Claims, 1 Drawing Sheet

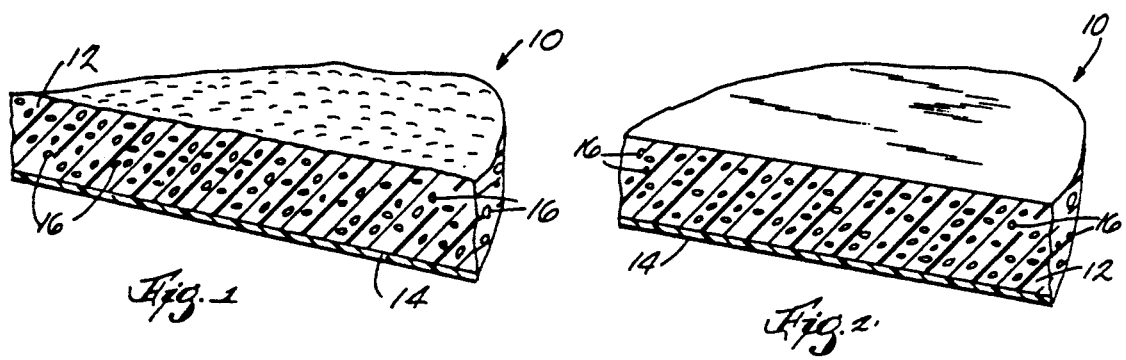
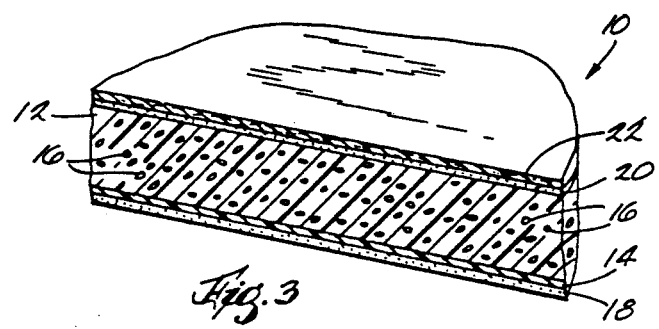
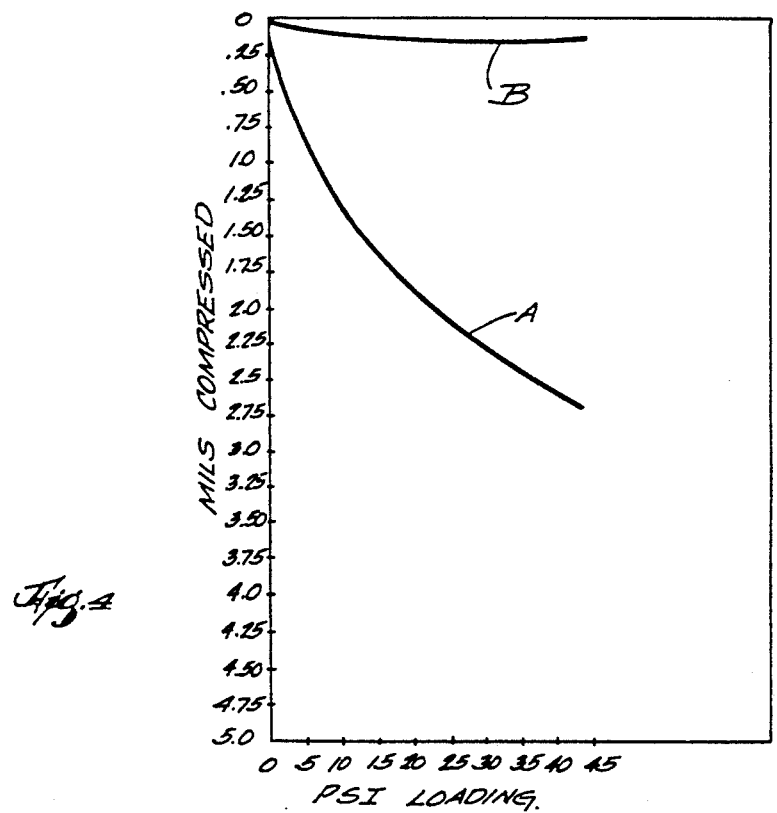
Fig. 4

BACKING FOR FLEXOGRAPHIC PRINTING PLATES

This is a continuation of copending application Ser. No. 07/843,892, filed on Feb. 27, 1992, now abandoned.

BACKGROUND OF THE INVENTION

1. Field of the Invention

The present invention relates to improved backing materials for flexographic printing plates. More particularly, the invention relates to relatively high density materials with discrete, separated closed cell encapsulated voids having improved properties when used as a means for mounting a flexographic printing plate on a printing cylinder.

2. Background Art

Flexography applies broadly to printing processes utilizing flexible substrates bearing elastomeric or rubbery relief printing surfaces. It requires less unit area pressure to effect good ink transfer than other processes. Examples of such printing plates are set forth in detail in U.S. Pat. No. 5,015,556 issued to Martens on May 14, 1991.

Historically, to mount the plates to the printing cylinder, double adhesive coated vinyl sheets commonly referred to as "sticky back" have been used. These sheets are incompressible and tend to vary in caliper up to 0.002 to 0.003 inch. The plate, plate cylinder and impression cylinder also each have variations in surface height or thickness. Thus, in a worst case scenario, if all of the plus and minus variations happen to fall in the same areas, the total variation may be as much as 0.004 to 0.008 inch. Such inaccuracies dictate the use of increased pressure in the printing process, but such increased pressure causes a deterioration in print quality due to yielding under pressure of the printing plates. Undesirable results include a dirty appearance of the printing and inaccurate reproduction of half tones. Thus a need exists for backing materials having more uniform thickness. This need has also been increased due to the increased use of thinner plates produced by laser engraving or photopolymerization techniques.

It has also been proposed to use layers of synthetic polymeric foams as backing materials in an effort to overcome these shortcomings. See for example, U.S. Pat. No. 3,903,794 issued to Grupe et al. on Sep. 9, 1975 in which the use of a composite cushioning member is formed from a foam and a fabric backing. Other composite materials are shown, for example, in U.S. Pat. No. 4,303,721 issued to Rodriguez on Dec. 1, 1981. Other foam-shaped materials are shown, for example, in U.S. Pat. No. 4,574,697 issued to Feeley on Mar. 11, 1986.

Even in light of these various available backings, a need has continued to exist for improved materials that will cushion a printing plate to allow flexing of the printing surface during the printing process but yet which would rebound rapidly to substantially the original thickness within a fraction of a second so that high quality prints can be made repeatedly.

Composite and foam materials hitherto available have suffered either from lack of deformability, or if they are readily deformable, from a lack of sufficient resiliency to rebound rapidly enough and repeatedly to the original dimensions. Most such materials also are not sufficiently accurate in caliper.

To compensate for these problems it is currently common practice to use composite and foam materials for printing half tone portions of the copy being reproduced but not for the solid portions of the copy, as they lack sufficient density and caliper accuracy to reproduce solids without a grainy or incomplete (snowflake) appearance.

Briefly summarized, the invention provides an improved cushioning sheet material adapted to be positioned between a flexographic printing cylinder and a flexible printing plate. The cushioning sheet material has a uniform thickness to within about 0.00025 to 0.0005 inch of the desired thickness and a density greater than 40 pounds per cubic foot. It is sufficiently deformable to experience a reduction in thickness of 6 to 9 percent when subjected to a compressive force of 45 psi and has a resiliency sufficient to recover at least 99.5 percent of its original thickness within 0.1 second after the compressive force is removed.

DRAWINGS

The invention will be further set forth in the following detailed description and accompanying drawings wherein:

FIG. 1 is a magnified cross-sectional view of a broken away segment of a resilient backing material of this invention prior to microsanding;

FIG. 2 is a magnified cross-sectional view of the material of FIG. 1 subsequent to microsanding;

FIG. 3 is a magnified cross-sectional view of the backing of FIG. 2 after coating on both sides with a pressure sensitive adhesive and with a release liner in place; and FIG. 4 is a graph illustrating a compressibility and recovery curve for materials of this invention.

DETAILED DESCRIPTION

Referring specifically to FIG. 1, there is seen a composite backing material 10 of this invention. Layer 12 is an elastomeric cushioning material, preferably polyurethane, containing discrete, separated closed cell voids 16 which form pneumatically compressible pockets believed to be critical to providing the improved performance of the materials in recovering rapidly from compressive forces. Layer 12 is formed by coating onto a base film of biaxially oriented polyethylene terephthalate film having a thickness of 2 to 10 mils. Layer 12 preferably has a thickness of 30 to 60 mils after microsanding as seen in FIG. 2. Microsanding can be preferably carried out using commercially available equipment such as a Curtin-Hebert 450 Series Microgrinder.

Referring now to FIG. 3 there is seen a layer of pressure sensitive adhesive 18 coated to a thickness of 1 to 2 mils on the polyethylene terephthalate base film for the purpose of adhering the backing sheet 10 to a print cylinder. The microsanded side of layer 12 is also coated with a pressure sensitive adhesive 20, preferably to a thickness of 1 to 2 mils. A release liner 22 is placed over adhesive layer 20 to protect the same during mounting onto the print cylinder. This release liner is generally of a silicone coated paper type of conventional construction.

The cushioning materials of this invention contain dispersed closed cell voids preferably in the 10 to 50 micron diameter range. Occasional voids of greater diameter, such as approximately 100 microns are noted to be present, and do not, in minor amounts, interfere with the performance of the materials. The materials of this invention are distinguishable from conventional foams which, in magnified cross-section, appear to consist of a sheet of bubbles that are adhered together at their points of contact. The materials of this invention contain rather widely separated closed cell voids that provide a pockets within which the encapsulated air can be pneumatically compressed when compressive force is applied, and which will rebound rapidly when the compressive force is relieved. The preferred materials of this invention are formed from a blend of filler particles that includes comminuted elastomer particles (preferably formed of a resilient cross-linked elastomer) in the 1 to 3 micron range and, if desired, a more finely divided inorganic filler such as silica. The particles of filler are held together in a matrix of polyurethane material that can be cured into a sheet material utilizing a catalyst such as an organotin catalyst, for example, stannous octoate or didutyltin dilaurate. The finely dispersed voids can be produced in the material either by mechanically whipping air therein or by using a foaming agent such as a small amount of conventional aqueous or other chemical blowing agent.

Both the matrix and the elastomeric filler particles are preferably formed of a polyetherpolyurethane formed by the reaction of a polyether polyol with polyisocyanate. The polyisocyanates used in producing such materials are preferably aromatic isocyanates, but aliphatic and cycloaliphatic isocyanates or mixtures thereof can be used as well. Such isocyanates include toluylene-2, 4-diisocyanate, toluylene-2, 6-diisocyanate, meta-phenylene diiocyanate, biphenylene-r, 4'-diisocyanate, methylene-bis (4-phenyl isocyantate), 4-chloro-1, 3-phenylene diisocyanate, napthylene-1, 5-diisocyanate, tetramethylene-1, 4-diisocyanate, hexamethylene-1, 6-diisocyanate, decamethylene-1, 10-diisocyanate, cyclohexylene-1, 4-diisocyanate, methylene-bis (4-cyclohexyl isocyanate), tetrahydronapthylene diisocyanate, isophorone diiocyanate and the like.

Examples of polyether polyols useful for producing polyetherurethanes of this invention include polyethylene ether glycol, polypropylene ether glycol, polytetramethylene ether glycol, polyhexamethylene ether glycol, and the like. Lower molecular weight aliphatic diols or diamines can be used as desired as chain extenders. Examples include butane diol, ethylene glycol or ethylenediamine.

The following test procedure is used to differentiate materials that will work in the practice of the invention. The preferred machinery used is an Ames Comparator Model 130 with a 352 dial graduated in 1/10 of one thousandth of an inch segments and a P-501 flat $\frac{3}{8}''$ diameter foot manufactured by B.C. Ames Co., Waltham, Mass. Also used are the following weights, most also purchased from B.C. Ames Co.(A combination of ounce and gram weights as all were not purchased at the same time).

|    | WEIGHTS   | TOTALS     | CONVERTED TO OUNCES |
|----|-----------|------------|---------------------|
| #1 | 90 grams  | 90 grams   | 3.175 oz            |
| #2 | 6 oz      | 170 grams  | 6.0 oz              |
| #3 | 355 grams | 355 grams  | 12.5 oz             |
| #4 | 800 grams | 800 grams  | 28.2 oz             |
| #5 | 32 oz     | 907.2 grams| 32.0 oz             |
|    |           | 2322.2 grams | 81.875 oz         |

The area of the $\frac{3}{8}''$ diameter foot is Area = $RR^2$
or $3.1416 \times .1875^2$.
$.1875 \times .1875^2 = 03515625 \times 3.1416 = .110447$
Area = .110 in$^2$

PSI GENERATED BY EACH WEIGHT:

1 @ 90 g   $\dfrac{.180850721\#}{.110447 \text{ in}^2}$ = 1.6374432 PSI or 1.64 PSI

2 @ 6 oz   $\dfrac{.375\#}{.110447 \text{ in}^2}$ (6 oz/10 oz = .375) = 3.3952936 PSI or 3.40 PSI

3 @ 355 g   $\dfrac{.7133555\#}{.110447 \text{ in}^2}$ = 6.4588037 PSI or 6.46 PSI

4 @ 800 g   $\dfrac{1.6075619\#}{.110447 \text{ in}^2}$ = 14.55052 PSI or 14.56 PSI

5 @ 32 oz   $\dfrac{2\#}{.110447 \text{ in}^2}$ (32 oz/16 oz) = 2# = 18.108232 PSI or 18.11 PSI The test is run as follows: Take a caliper reading with no weights on the Ames gauge, wait a timed 30 seconds and record. Place weight #2 on stud on gauge and wait 30 seconds. Take a caliper reading and record. Remove weight and wait 30 seconds again and take a reading of recovered caliper. The difference between the first recorded weight with no weight and the last recorded weight with no weight is the unrecovered caliper.

Repeat the above procedure for the following:

| ⅜ Ft. #1, #3 | 1.64 PSI + 6.46 PSI = 7.92 PSI |
| ⅜ Ft. #1, #4 | 1.64 PSI + 14.56 PSI = 16.2 PSI |
| ⅜ Ft. #1, #3, #4 | 1.64 PSI + 6.46 PSI + 14.56 PSI = 22.66 PSI |
| ⅜ Ft. #4, #5 | 14.56 PSI + 18.11 PSI = 32.67 PSI |
| ⅜ Ft. #1, #2, #3, #4, #5 | 1.64 PSI + 3.40 PSI + 6.46 PSI + 14.56 PSI + 18.11 PSI = 43.99 PSI |

All tests for different weights are done on an untested portion of the sample. Do not use the same area of sample for more than one test.

The following is a representation of the values tested on material of this invention:

| WT. | PSI | Initial Caliper | Compress Caliper | Mils Compress | Recovered Caliper | Mils not Recovered |
|-----|-----|-----------------|------------------|---------------|-------------------|--------------------|
| #2 | 3.40 | 40.8 | 40.1 | .7 | 40.7 | .1 |
| #1, #3 | 7.92 | 40.9 | 39.8 | 1.1 | 40.8 | .1 |
| #1, #4 | 16.20 | 40.9 | 39.2 | 1.7 | 40.7 | .2 |
| #1, 3, 4 | 22.66 | 40.8 | 38.8 | 2.0 | 40.6 | .2 |
| #4, #5 | 32.67 | 40.9 | 38.7 | 2.2 | 40.8 | .1 |
| #1, 2, 3, 4, 5 | 43.99 | 40.8 | 38.1 | 2.7 | 40.7 | .1 |

These results are then developed into a compressibility recovery curve, or deflection curve shown in FIG. 4 where the upright scale represents mils and the horizontal scale represents PSI. The lower curve (curve A) is the compression curve representing the amount of deformation under compression. The upper curve (curve B) is the recovery curve representing the amount that the material does not recover after the compressive force is relieved. The area between curves represents the amount of recovery of the sheet material. The area above the top curve represents the amount of unrecovered deformation of the sheet material while that between the two curves represents the amount of recovery occurring in the deformed material.

To apply the pressure sensitive adhesive (PSA), a differentially coated paper silicone release linear of 60 to 80 pounds per 3000 square feet ream is coated on its easier release side with an acrylic adhesive in a thickness of 1 to 2 mils, dryed and then laminated to the base film side of the sheet material. A liner such as Big-84-PSK73C/PPS260 N from Release Technologies in North Chicago, Ill. is an example with a release ratio of 3:1 and an adhesive such as PS 61 from Rohm & Haas in Chicago, Ill., having an initial reel of 15 ounces but an aged peer of 35 ounces (PSTC Test #1) and a shear resistance (PSTC Test #7, 1"×½" Kg) greater than 100 hours. Other liners and other acrylic or rubber based adhesives may be used as long as they have at least 30 ounces of peel and over 100 hours of shear.

After the base film side of the sheet material has been coated, the roll of materials is then coated on opposite sides of the differential liner with a PSA such as 386-07 from Franklin Adhesives, Columbus, Ohio which exhibits the ability to bond tightly with the sanded side of the sheet material. The coated liner is then wound into a roll thereby transferring the PSA of the sanded side of the sheet material upon removal of sheet material from the roll. Upon unwinding the release liner remains on the sanded side of the composite sheet. The PSA on the base film side is exposed for application to the plate cylinder.

This process can be reversed if it is desired to expose the PSA on sanded the sanded side of the sheet material upon unwinding from the roll in the event application to the back of the plate prior to mounting the sheet material and plate to the plate cylinder is desired.

In accordance with a further embodiment the base film can be eliminated by casting the cushioning sheet material onto the easy release side of a differential paper liner precoated with an adhesive such as Rohm and Haas PS61. The release liner provides the stretch resistance necessary to allow the surface of the sheet material to be microsanded to a desired thickness. The sanded material can then be coated on the opposite, tighter release side with a PSA such as Franklin Adhesives PSA386-07 and then wound into a roll. The resultant sheet material without the film carrier would provide a highly formable and flexible mounting for flexographic plates.

EXAMPLE

A sheet of polyether polyurethane material having a density of 45 lbs per ft$^3$ was prepared. A filler material consisting of cross-linked polyether polyurethane rubber comminuted to a particle size of 1 to 3 microns was used. A matrix polyether polyurethane was used having the following composition:

| | |
|---|---|
| Methylene diisocyanate | 75 parts |
| Polyether polyol: | |
| polypropylene oxide | 75 parts |
| polyethylene oxide | 25 parts |
| Ethylene glycol | 8 parts |
| 1, 4-butane diol | 17 parts |

The matrix material was cured utilizing an organotin catalyst and a small amount of water as a foaming agent. Widely separated discrete voids were thus formed in the material which had an average diameter of 10 to 50 microns. The cured material had a void volume percentage of 33% with the balance being formed of the matrix and polyether polyurethane elastomer filler particles. The material was cast on a sheet of polyethylene terephthalate having a thickness of 7 mils. After curing, the material was microsanded using a Curtin-Hebert 450 Series Microgrinder to a composite finished thickness of 40.8 mils with a variability less than ±0.25 mil. The material was microground by passing it through the microgrinder using a 120 grit silicon carbide paper and then passing through again using a 220 grit paper. After sanding the base layer side was coated with an acrylic type pressure sensitive adhesive, Rohm and Haas PS61. The sanded side was also coated with an acrylic type pressure sensitive adhesive, to a thickness of 1 to 2 mils. The material was mounted on a printing cylinder and used a backing for a commercial flexographic printing plate with excellent results.

Due to variations in the thickness of the matrix material it is important that the unsanded material be prepared so that the thinnest areas be a minimum of 2 mils thicker than the desired finished sanded thickness. Thus, the cast material should have a minimum thickness at any point of 42 mils in order to result in a finished thickness of 40 mils after sanding.

While the preferred thickness of the finished layer of cushioning material is 30 to 60 mils it is possible to make such materials as thin as 20 mils or as thick as 80 mils in order to obtain a material having a deformability such that a 6% to 9% reduction in thickness occurs under a compressive force of 45 psi. It is necessary to adjust the density of the material, i.e., if the thickness is less than 40 mils the density must be reduced below 40 pounds per cubic foot. On the other hand, if materials thicker than 60 mils are produced, the density needs to be increased to over 50 pounds per cubic foot in order to provide a material having the desired deformability and recoverability properties.

What is claimed is:

1. In combination, a flexographic printing cylinder, a flexible printing plate and a cushioning backing sheet material positioned between said cylinder and said plate, said backing sheet material being formed of an elastomeric matrix containing as a filler, comminuted particles of a resilient cross-linked elastomer of approximately 1 to 3 microns in diameter and discrete, separated voids approximately 10 to 50 microns in diameter, said backing having a uniform thickness of about 30 to 60 mils and having a density greater than 40 pounds per cubic foot, and being sufficiently deformable to experience a reduction in thickness of 6 to 9 percent when subjected to a compressive force of 45 psi and having a resiliency sufficient to recover at least 99.5 percent of its original thickness within 0.1 second after said compressive force is removed.

2. A combination according to claim 1 wherein said sheet material is microsanded on one side so that the thickness thereof does not vary more than 0.0005 inch.

3. A combination according to claim 2 wherein the opposite side of said sheet is adhered to a layer of polyethylene terephthalate having a thickness of about 2 to 10 mils.

4. A combination according to claim 1 wherein said backing comprises a polyether polyurethane matrix.

5. A backing material for mounting flexible printing plates to a printing cylinder comprising
   a base film having a thickness of 2 to 10 mils,
   a layer of resilient cushioning material adhered to said base film having a uniform thickness of about 30 to 60 mils and comprising 25 to 40 percent by volume of pneumatically compressible, discrete closed cell voids, the majority of which are in the 10 to 50 micron range and are separated from each other by a tough resilient elastomeric matrix, said matrix containing particles of a resilient cross-linked elastomer approximately 1 to 3 microns in diameter, said layer being microsanded on its exposed side to provide a uniform caliper within 0.0005 inch, said layer having a density greater than about 40 pounds per cubic foot and being sufficiently deformable to experience a reduction in thickness of 6 to 9 percent when subjected to a compressive force of 45 psi and having a resiliency sufficient to recover at least 99.5 percent of its original thickness within 0.1 second after said compressive force is removed.

6. A backing material according to claim 5 wherein said base sheet comprises polyethylene terephthalate coated on its exposed side by a pressure sensitive adhesive, the exposed microsanded side of said cushioning material also being coated with a pressure sensitive adhesive.

7. A backing material according to claim 6 wherein said microsanded side is adhered to a removable release liner.

8. A backing material for mounting flexible printing plates to a printing cylinder comprising
   a layer of resilient cushioning material having a uniform thickness of about 30 to 60 mils and comprising 25 to 40 percent by volume of pneumatically compressible, discrete closed cell voids, the majority of which are in the 10 to 50 micron range and are separated from each other by a tough resilient elastomeric matrix, said matrix containing particles of a resilient cross-linked elastomer approximately 1 to 3 microns in diameter, said layer being microsanded on its exposed side to provide a uniform caliper within 0.0005 inch, said layer having a density greater than about 40 pounds per cubic foot and being sufficiently deformable to experience a reduction in thickness of 6 to 9 percent when subjected to a compressive force of 45 psi and having a resiliency sufficient to recover at least 99.5 percent of its original thickness within 0.1 second after said compressive force is removed
   a coating of pressure sensitive adhesive on each side of said material.

* * * * *